Nov. 16, 1965  F. A. HOWARD  3,217,733
ELASTOMER PLUG DUAL VALVE
Original Filed July 13, 1960  2 Sheets-Sheet 1
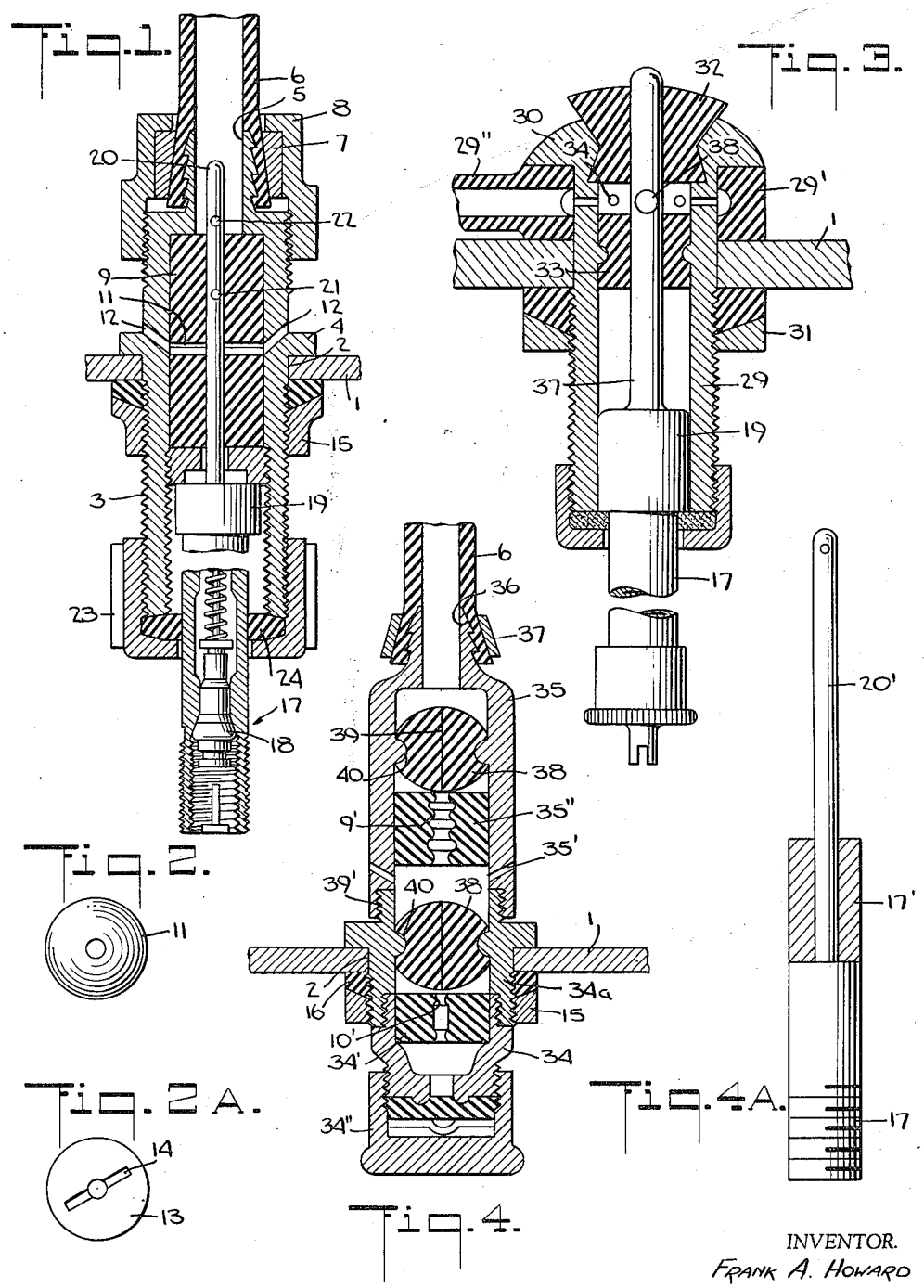
INVENTOR.
FRANK A. HOWARD
BY
Kenyon & Kenyon
ATTORNEYS

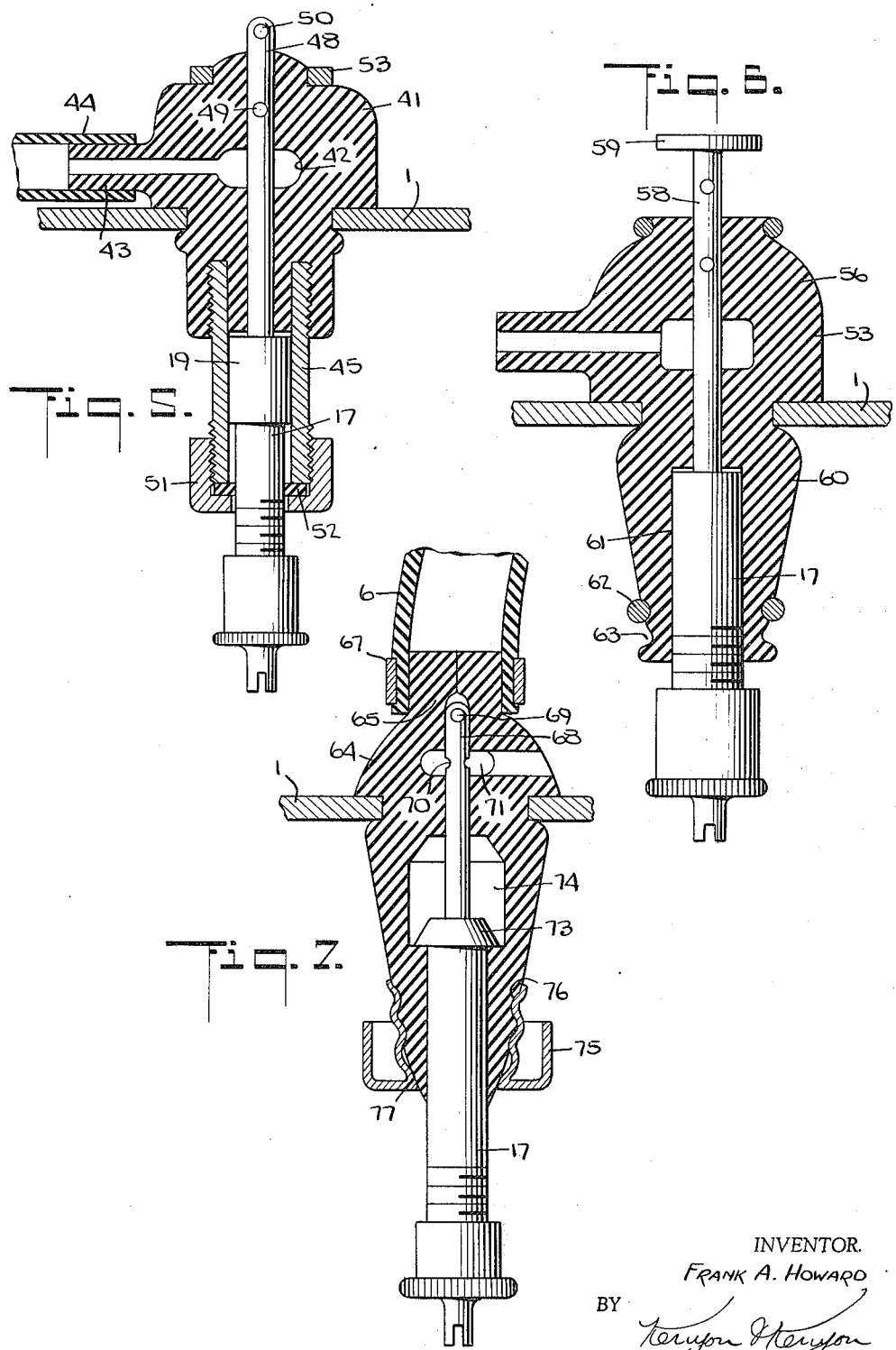

United States Patent Office 3,217,733
Patented Nov. 16, 1965

3,217,733
ELASTOMER PLUG DUAL VALVE
Frank A. Howard, New York, N.Y.; Irma Amelie Howard, Frank A. Howard, Jr., and The Chase Manhattan Bank, executors of said Frank A. Howard, deceased
Original application July 13, 1960, Ser. No. 42,626, now Patent No. 3,065,763, dated Nov. 27, 1962. Divided and this application Oct. 12, 1962, Ser. No. 230,036
17 Claims. (Cl. 137—226)

This application is a division of my co-pending application Serial No. 42,626, filed July 13, 1960, for "Elastomer Plug Dual Valve" which issued as Patent No. 3,065,763 on November 27, 1962.

My invention relates to valves and especially to dual valves suitable for use in dual compartment tires such as those shown in my Patent No. 2,934,127 and my co-pending application No. 585,223, now patent number 2,969,824. Such valves present unusual problems of standardization and also afford opportunity for the use of novel designs not adapted for large fluid control devices. The invention will be fully understood from the following specifications taken in connection with the accompanying drawings in which FIGURE 1 is a cross section, partly in elevation, of a dual valve, FIGURE 2 is a face view of the radially corrugated washer which separates the elastomer plug seals of the valve and provides air passages through the space between these two seals, FIGURE 2a is a face view of the nut which retains and compresses the elastomer plug seals, and FIGURES 3, 4, 5, 6, and 7 are sections of modified valve constructions making use of various forms of elastomer plugs to be used in combination with hollow needle air tubes. FIGURE 4a shows a separate inflation valve and attached hollow needle for use with the fixed assembly of the dual valve which is shown in FIGURE 4.

Referring more particularly to FIGURE 1 of the drawings the number 1 designates a fragment of a rigid metallic rim having the usual relatively large valve opening 2 provided for present standard rubber snap-in valves. The dual valve of my invention has a straight cylindrical body portion 3 provided with an outside flange 4 and a reduced nipple 5 on the upper end, serrated externally for attachment of a tube 6. The tube 6 is fastened to the serrated nipple 5 by a tapering ring 7 which may be squeezed inward to compress the tube against the serrated nipple by a gland nut 8 threaded on to the upper end of the valve body 3.

Two elastomer plug seals 9 and 10 which form the sealing sections of the valve are mounted en-to-end within the bore of the valve body and are separated by a radially corrugated metal washer 11 which is shown in face view in FIGURE 2, the corrugations of the washer providing an air delivery zone between the plugs 9 and 10. Openings 12 through the body 3 of the valve form a communication between the air delivery zone between the plugs and the space surrounding the valve. The elastomer seals 9 and 10 are preferably of somewhat greater initial or unstressed diameter than the bore of the body 3 so that they must be radially compressed as they are forced into the valve body. To bring axial pressure upon them to push them home and also to hold them in axial compression there is provided a nut 13 having screw driver slot 14 in its face. This permits the nut to be rotated on its thread in the bore of the valve 3 to force the two plug seals 9 and 10 and the washer 11 into their final position as shown in FIGURE 1 and retain them in an axially compressed condition. Axial compression of the confined seals by the nut 13 tends to expand them radially to further perfect an air-tight joint with the bore of the valve body 3 and with the fissure which forms the hollow needle air passage later described. A permanent bond and seal between the plugs and the bore of the valve body may, if desired, be obtained by swabbing the bore with cement before inserting the plugs. The valve body 3 is adapted to be locked in the opening 2 in the rim 1 by a gland nut 15 which is run up on external threads on the body 3 and compresses a sealing ring 16 against the outside face of the rim and against the outside wall of the valve body 3 to make an air-tight seal at this point.

To cooperate with the dual valve body 3 and its enclosed plug seals 9 and 10 there is provided a standard tire inflation valve designated 17 which carries the usual internal check valve or core 18. The barrel of the inflation valve carries a collar 19 and a polished slim tube or blunted hollow needle 20 which passes through axially aligned openings in the seals 9 and 10. The original or unstressed openings are somewhat smaller in diameter than the hollow needle 20 so that when the needle is inserted the walls are compressed to perfect an air-tight seal around the wall of the needle. Also it may be desirable to mold these plug seals with internal ring corrugations as shown at 9' and 10' in FIGURE 4 to give maximum insurance against air leakage along the wall of the needle. The wall of the hollow needle is interrupted to provide air openings 21 and 22 as shown in FIGURE 1.

To complete the construction of the dual valve a gland nut 23 is provided to engage external threads on the end of the valve body 3 and to compress axially and expand radially inward an elastic ring gasket or washer 24 which thus forms a friction lock and an air seal against the body of the inflation valve 17.

The valve construction shown in intended especially for use in a dual compartment tire, examples of which are shown in my Patents 2,934,127 and 2,969,824. The rubber tube 6 is to be connected with an opening in the wall of the omega ring in the manner, for example, of the tube 9 shown in FIGURES 1 and 2 of the said co-pending application. The complete dual valve may be assembled before mounting the tire, with the exception of the sealing gasket or ring 16, the nut 15 and the gland nut 23 and its washer 24 which are to be applied only after the dual valve body 3 has been inserted through the valve hole 2 in the rim 1, from the inside. The tube 6 may be cut to the appropriate length at the time the valve is assembled if it is to be used for field installations.

When a dual compartment tire, such as that shown in my patent and application above referred to, has been mounted on the rim it is usually desirable to inflate the inner chamber of the tire first in order to seat the beads. To accomplish this, the gland nut 23 is loosened and the inflation valve 17 is withdrawn to the limit of its motion when the collar 19 is stopped by the flange of the gland nut 23 and the washer 24. The gland nut may then be turned up tightly to lock the valve 17 in its outward position and permit an inflation hose to be applied to the upper end of the valve 17 without moving it. In this position of the parts the opening 21 in the hollow needle 20 will register with the delivery zone between the two seals formed by the corrugated washer 11. Inflation air introduced through the valve 17 in the usual way will thus be delivered into the inner tire compartment through the openings 12 and this will force the beads of the tire outwardly on the rim to their final position. When this initial tire mounting step has been completed and before inflating the inner tire compartment to its operating pressure, it is customary to inflate the outer tire compartment which may be done by loosening the gland nut 23 and pushing the inflation valve 17 inward to the limit of its motion. This will bring the opening 22 in the hollow needle outside of the seal 9, while the opening 21 will now lie in the center of the seal. Inflation or deflation of the inner and outer tire compartments may thereafter be conducted in an obvious manner.

The construction shown provides a multiple seal to prevent escape of air from either the inner or outer tire chamber. Thus escape of air through the standard inflation valve 17 is prevented not only by its inwardly-opening check valve 18 but also by the usual valve cap shown in other figures of the drawings. Escape of air through or around the plug seal 10 which is normally prevented by its tight fit within the bore of the valve body 3 and by its grip on the needle 20 is further prevented by the seal provided by the elastic washer 24 when the gland nut 23 has been set firmly in position to lock the valve 17. The gland nut 23 may be heavily knurled so that it is easily loosened and tightened by finger hold and without tools.

The compressed plug seals 9 and 10, which may be of rubber or rubber substitute in the form of various synthetic elastomers, replace all mechanical arrangements to permit a standard inflation valve, such as the valve 17, with the addition of the hollow needle 20 to its body, to function as the adjustable part of a dual tire valve, reliably preventing passage of air between the inner and outer tire chambers and at the same time providing for the customary use of the standard tire inflation valve 17 to inflate or deflate separately either of the tire chambers by adjusting its axial position, as described.

In FIGURE 3 I have illustrated a simplified construction. Here the valve body designated 29 has a flanged head 30 which may be pulled down by a nut 31 to compress and seal the thickened disk 29' which carries the air tube 29" corresponding to air tube 6 previously described. The two plug seals are forcibly compressed into the valve body 29 and are retained therein in the positions shown by internal contractions or ribs formed in the bore of the body which register with matching contracted waist sections of the plug seals as shown, the plug in the outer open end of the valve body being designated 32, and the plug within the barrel of the valve body designated 33. The plug seals 32 and 33 are spaced apart and the valve body 29 is perforated as shown at 34 at the location of the zone between them so that air may pass through into the tube 29". The barrel 17 of the standard tire inflation valve has a collar 19 as before, which has a sliding fit within the bore of the dual valve body 29. On the end of the collar portion 19 the inflation valve 17 carries a hollow needle here designated 37 having one or more holes 38 in its outer portion. As in the case of FIGURE 1, a gland nut which is threaded on to the dual valve 29 may be set up to compress a packing washer and also serves to limit the outward motion of the inflation valve 17 when it is adjusted axially to bring it to the position shown in FIGURE 3, so that the opening 38 in the hollow needle will register with the zone between the plugs 32 and 33. By setting up the gland nut as described in FIGURE 1, the inflation valve may be locked in this position and at the same time a second seal is formed around its barrel to trap any air which may leak through or around the plug seals. It will be clear that upon loosening the gland nut the inflation valve may be moved axially inward until it strikes the lower plug seal 33 at which point the needle opening 38 will have emerged from the upper plug seal 32 and will be able to deliver air freely into the zone above the valve.

In FIGURES 4 and 4a I have illustrated a modified form of dual valve made up of a fixed assembly which utilizes in addition to the plug seals with central passages previously described two spaced self-closing rubber valves which form elastomeric partitions having axial fissures or slits which are normally held closed by the compressed state of the mounted valves, removable valve cap which provides a second positive seal outside of the rubber valve partitions, and an entirely separate inflation needle carrying a standard tire inflation valve, one of these separate needle-and-valve assemblies sufficing for use with any number of fixed valve assemblies on a vehicle. In this modified design the dual valve body is made in three sections, an outer section 34 which carries a plug seal 34' threaded into a middle section 34a which fits the opening 2 in the rim 1, and an inner section 35 which carries a serrated nipple 36 for attachment of the tube 6. In this case the tube 6 is shown as secured on the nipple by forcing down over it a slightly tapered ring 37. The inner body section 35 carries a second plug seal 35". The middle and inner body sections of the valve are fitted with self-closing rubber plug valves 38 of a well-known type provided with one or more fissures in the form of slits in the central portion as indicated at 39 and each molded with a groove 40 in the mid-section, so that when forcibly compressed through an opening in a flange in the barrel of the valve body it will expand outward to lock itself in place and form a tight joint. The compressed condition of these plug valves when they have been so mounted also serves to seal the slits 39 as is well known. After the plugs 38 have been positioned in the two sections of the valve body, the sections are assembled by a threaded joint at 39' as shown in the drawing. In this assembled position the zone between the two plugs communicates with the space around the valve section 35, as by means of drilled holes 35'. The middle valve body section is locked and sealed in the rim 1 by a gland nut 15 and washer 16 as in FIGURE 1. The outward end of the valve body section 34 may be reduced and fitted with a threaded cap and sealing washer as shown at 34" in FIGURE 4.

To cooperate with the fixed assembly portion of the form of dual valve which is shown in FIGURE 4 I use a standard inflation valve 17 equipped with a hollow needle as shown in FIGURE 4a. To use this valve it is only necessary to remove the sealing cap 34" from the end of the outer valve body section 34, and insert the hollow needle 20' through the central opening in the outer end of the body section 34, after which it is forced through the smaller central opening in the plug seal 34' to form a tight seal around the needle and then through the slit in the self closing rubber valve 38 of the middle valve section. The seal provided by the outer plug 34' around the wall of the needle prevents leakage of air outward around the needle when it is pushed through the slit in the outer self-closing plug valve 38. Markings may be applied to the needle to indicate the proper insertion to be used for delivery of air into the zone opposite the valve body openings 35' and thence to the inner tire chamber through these openings 35'. In the alternative a removable sleeve 17' of the correct length may be supplied with the inflation valve, so that by slipping the sleeve over the hollow needle 20', as shown in FIGURE 4a, it may be pushed inward until stopped by the sleeve, at which point an opening at or near the end of the needle 20' will lie in the middle zone. On removal of the sleeve 17' the needle 20' may then be inserted full length, at which point its air delivery opening will be clear of the slit 39 in the inner plug 38 and air will be delivered into or out of the outer tire compartment through the tube 6.

The construction shown in FIGURES 4 and 4a which is claimed in this application, therefore, provides an economical design of fixed assembly for a multiple valve to which a standard removable valve cap may be applied to give a second positive seal against slow loss of air by leakage through the normally-closed elastomeric partitions which constitute rubber valves, this form of fixed assembly being capable of use with a separate inflation needle carried by a standard tire air-inlet-valve structure. When the removable valve cap on the fixed assembly has been taken off and the inflation needle inserted to inject air into or withdraw air selectively from any one of the tire compartments served by the fixed assembly, the rubber plug seals 34'-35" supplement the self-closing fissures in the rubber partitions 38 to insure against leakage of air to atmosphere. Thus a dual seal against leakage is always provided, both when the fixed assembly and its removable cap are being relied upon to hold the air and also when the valve is removed and a separate inflation needle is in use.

In FIGURE 5 I have shown a simplification of construction in which the two rubber plug seals which provide the separate air delivery zones for the dual valve are formed by a single molded rubber plug designated 41 which can be pushed forcibly into the opening in the rim 1 from the inside and is then retained in position both by its own elastic outward pressure on the opening in the rim 1 into which it has been forced, and by the internal air pressure which pushes the shoulder of the rubber plug 41 against the inner face of the rim. This general construction is familiar to the tire trade under the name of "snap-in valve." Within the central portion of the special rubber snap-in plug 41 incorporating my invention, there is molded a cavity 42 which opens into the bore of a rubber nipple 43 to which there is secured a tube 44 corresponding to the tube 6 shown and described in FIGURES 1 and 4. There is molded into the outer portion of the rubber plug 41 a metal nipple 45 which serves to guide and retain the barrel of the standard tire inflation valve 17. As in the case of FIGURE 3 this tire inflation valve has an enlargement or collar 19 on its inner end and carries a hollow needle here designated 48. The hollow needle is in this case provided with air openings at two levels, one as shown at 49 some distance inward from the end of the needle, and the other as shown at 50 at or near the end of the needle. The metal nipple 45 of the dual valve body is provided with a gland nut 51 which can compress an elastic gasket or washer 52 which serves as a seal around the barrel of the standard inflation valve 46 and also serves as a stop to limit the outward travel of the inflation valve 46, all operating as described in FIGURES 1 and 3. If desired a metal ring 53 may be forced around the extreme outer end of the rubber plug 41 to hold it in compression in order to insure maintenance of a tight outer seal around the needle 48. The compression fit of the plug 41 in the rim 1 serves a similar purpose for the inner seal.

In the position which the inflation valve 17 occupies in FIGURE 5, it will be seen that the opening 49 of the hollow needle is hermetically sealed by the surrounding wall of the plug 41 while the opening 50 at the end of the neede is free to deliver air into or out from the zone or chamber surrounding the valve. By moving the inflation valve 17 axially outward to the limit of its motion, the opening 49 in the hollow needle registers with the cored cavity 42 in the center of the plug 41 while the opening 50 in the outer end of the needle is now blanked by the outer sealing portion of the plug 41. Therefore in this outward position of the inflation valve 46 air will be delivered through the hollow needle into and through the tube 44.

In FIGURE 6 I have shown an alternative and still further simplified design in which a snap-in rubber plug designated 53 serves both as a double plug seal and as the guide for the standard tire inflation valve 17 which carries a hollow needle 58 on its end, as previously described. In the simplified design of FIGURE 5 the outward motion of the tire inflation valve 57 within the plug is limited by providing a head 59 which is attached to the needle 58. The outer portion of the snap-in rubber plug which is designated 60 is formed with a cylindrical bore 61 which provides a sliding fit around the matching cylindrical barrel of the inflation valve 17. Inward adjustment of the inflation valve is limited by the bottom of this molded cavity in the snap-in plug while outward motion is limited, as above described, by the head 59 on the hollow needle 58. The valve 17 is normally locked in position and also hermetically sealed within the bore 61 by a ring 62 which may be forced inward by hand to seat tightly in and compress a groove around the outer portion of the rubber section 60. To loosen the valve 17 for adjustment purposes the metal ring 62 may be pulled outward to lie loosely in a smaller groove 63.

In FIGURE 7 I have shown an alternative simplified design in which there is used a rubber snap-in dual valve body designated 64. This carries on its end a boss 65, the outer end of which may be centrally slitted to form a self-closing rubber valve of the type described in FIGURE 4. Alternatively the boss 65 may take the form of a short metal nipple molded into the plug 64 and with a serrated open end as shown at 5 in FIGURE 1. A tube 6 which replaces the tubes earlier described as a means of delivering air to an outer tire chamber may be connected to this boss 65. The tube 6 may be held on the boss by a metal compression ring 67 which also serves to insure a tight fit around the hollow needle 68 when it is pushed through the slits in the end of the boss 65, and insure the closing of these slits in the center of the boss to form a separate outer seal when the needle is withdrawn to the central bore of the plug in the position shown in FIGURE 6. Protection against flow of air out of the tube 6 is also provided by the seal around the needle, as in previous forms of the invention. In this case the needle has an opening 69 at or near its end and second openings 70 which in the position of the parts shown in FIGURE 6 registers with a cavity 71 molded into the dual valve body 64 to deliver air to the inner tire chamber surrounding the valve. As in the case of the construction described in FIGURE 6 this type of rubber snap-in valve carries no metal barrel but instead the barrel of the standard tire inflation valve 17 slides directly in and out within a matching cylindrical bore in the outer end of the snap-in dual valve body. To limit outward motion of the inflation valve 17 it may carry a tapering collar 73 which slides within an enlarged inner portion of the bore of the dual valve body, the rubber body being sufficiently elastic to permit the tapering collar to be forcibly pushed through the smaller outer bore to assemble the parts. To hold the inflation valve 17 in its adjusted position, either as shown in FIGURE 6 at the outer end of its travel, or at the inner end of its travel, with the collar 73 bearing on the inner end of the enlarged bore 74 and the opening 69 delivering into the tube 6 while the openings 70 are blanked by the smooth and radially compressed portion of the bore of the plug below the slitted outer end of the boss 65, I provide a pressed sheet-metal nut 75 provided with internal threads which engage coarse molded screw threads 76 formed on the rubber dual valve body 64. The end of the dual valve body beyond the threads 76 is tapered and the nut 75 is formed with a bearing portion 77 which presses against this tapered rubber end to lock the inflation valve 72 in its adjusted position and also form an air-tight seal around the barrel of the inflation valve. To reduce friction at the rubber screw threads, the inside of the metal nut 75 may be wetted before assembly, or it may be lubricated with a film of permanent lubricant such as glycerine in the case of elastomers which are attacked by oil, or may be lubricating oil or grease in the case of elastomers not attacked by these lubricants. It is also of advantage in all modifications of my design to apply such a permanet lubricant film to the hollow needle and to the barrel of the standard inflation valve to make assembly and adjustment easier.

While I have shown and described in some detail various embodiments of my invention, it will be understood that this is only for the purpose of making the essentials of the invention more clear and I do not regard it as limited to particular details shown or described save in so far as they may be defined by the appended claims, in which it is my intention to claim all novelty inherent in the invention as far as it permissible in view of the prior art.

What I claim is:

1. A dual valve for dual compartment pneumatic tires comprising a rigid tubular valve body adapted to be mounted in an opening in the rim carrying the tire, a pair of elastomer plugs disposed within the interior of said valve body with the adjacent portions of said plugs spaced apart from one another, each of said plugs forming fluid-tight seals with the confining inner walls of the valve body and having normally closed axially aligned slits therethrough, the surfaces of said slits abutting one another in the normally closed condition thereof, means carried by the dual valve body for separately collecting and delivering air from each of the two zones formed between the spaced plugs and beyond the inner plug, and a removable sealing cap carried by the exposed outer end of the valve body so as to seal an opening therein axially aligned with the slits through the plugs, whereby a double seal against leakage is provided and upon removal of the sealing cap a hollow inflation needle may be inserted through the said opening in the valve body and through the axially aligned normally closed slits of the elastomer plugs for selective delivery of air into or out of either of the said two zones.

2. A dual valve in accordance with claim 1 in which the elastomer plugs are of greater unstressed diameter than the cavity in the body in which they are mounted so as to be compressed radially when positioned in the body.

3. A dual valve in accordance with claim 1 in which a third elastomer plug is located outwardly of one of the first named elastomer plugs and provided with a normally open passage of predetermined cross section corresponding to but smaller than the cross section of the inflation needle with which the valve is designed to cooperate so as to prevent outward passage of air between the inserted inflation needle and the normally closed slit of the first named plug when the said slit has been forced open by insertion of the inflation needle.

4. A dual valve in accordance with claim 3 in which the normally open passage of said third elastomer plug contains an annular corrugation therein.

5. A dual valve in accordance with claim 1 in which an additional elastomer plug is located in the zone between the spaced elastomer plugs and provided with a normally open passage of predetermined cross section substantially corresponding to but smaller than the cross section of the inflation needle with which the valve is designed to cooperate so as to prevent the passage of air between the inserted inflation needle and said additional elastomer plug.

6. A dual valve in accordance with claim 5 in which the normally open passage of said additional elastomer plug contains an annular corrugation therein.

7. A dual valve for dual compartment pneumatic tires comprising a valve body adapted to be mounted in an opening in the rim carrying the tire, a pair of elastomer plugs disposed within the interior of said valve body with the adjacent portions of said plugs spaced apart from one another, each of said plugs forming fluid-tight seals with the confining inner walls of the valve body and having normally closed axially aligned slits therethrough, the surfaces of said slits abutting one another in the normally closed condition thereof, and means carried by the valve body for separately collecting and delivering air from each of the two zones formed between the spaced plugs and beyond the inner plug, whereby a hollow inflation needle may be inserted through the outer opening in the valve body and through the axially aligned normally closed slits of the elastomer plugs for selective delivery of air into or out of either of the said two zones.

8. A dual valve in accordance with claim 7 in which the elastomer plugs are of greater unstressed diameter than the cavity in the valve body in which they are mounted so as to be compressed radially when positioned in the body.

9. A dual valve in accordance with claim 7 in which an additional elastomer plug is located outwardly of the outer plug of said spaced elastomer plugs and provided with a normally open passage of predetermined cross section substantially corresponding to but smaller than the cross section of the inflation needle with which the valve is designed to cooperate so as to prevent outward passage of air between the inserted inflation needle and the normally closed slit of said outer plug when said slit has been forced open by insertion of the inflation needle.

10. A dual valve in accordance with claim 9 in which the normally open passage of said additional elastomer plug contains an annular corrugation therein.

11. A dual valve in accordance with claim 7 in which an additional elastomer plug is located in the zone between the spaced elastomer plugs and provided with a normally open passage of predetermined cross section substantially corresponding to but smaller than the cross section of the inflation needle with which the valve is designed to cooperate so as to prevent the passage of air between the inserted inflation needle and said additional elastomer plug.

12. A dual valve in accordance with claim 11 in which the normally open passage of said additional elastomer plug contains an annular corrugation therein.

13. A fixed assembly for a multiple valve for selectively controlling the air pressure in multiple compartment pneumatic tires comprising an elongated body portion with an axial opening in its outer end and adapted to be mounted axially intermediate its length in an opening in the rim carrying the tire, a plurality of axially spaced elastomeric air-sealing partitions embodied in the assembly, each having a normally-closed axially-aligned slit therein, the opposed surfaces of each of said slits abutting one another in the normally closed condition thereof, each of said slits being adapted to be forced open to permit passage of an inflation needle inserted through the outer opening, and means embodied in the assembly for separately delivering air to tire compartments mounted on the rim from the separate zones formed by the spaced elastomeric partitions.

14. A fixed assembly in accordance with claim 13 including a removable cap mounted on the open end of the body portion and forming an air-tight closure therefor when in its normal position.

15. A fixed assembly in accordance with claim 13 including an additional elastomeric partition on one side of a first named partition, the second partition having a central passage of similar cross section but of smaller unstressed diameter than the inflation needle with which the fixed assembly is designed to cooperate, whereby leakage of air around the needle when inserted in the slit is stopped by the second partition.

16. A fixed assembly in accordance with claim 13 in which the means for separately delivering air include a flexible air conduit for connecting the valve with one of the tire compartments.

17. A fixed assembly in accordance with claim 15 including a removable cap mounted on the opened end of the body and forming an air-tight closure therefor when in its normal position.

References Cited by the Examiner

UNITED STATES PATENTS 2,964,084  12/1960  Tubbs _____ 152—429 XR
2,991,821  7/1961   Williams _____ 152—427
3,034,558  5/1962   Steer et al. _____ 152—429

ISADOR WEIL, *Primary Examiner.*

WILLIAM F. O'DEA, *Examiner.*